United States Patent [19]

Shida et al.

[11] 4,087,588

[45] May 2, 1978

[54] ADHESIVE BLENDS

[75] Inventors: Mitsuzo Shida, Barrington; John Machonis, Jr., Schaumburg; Seymour Schmukler; Robert J. Zeitlin, both of Palatine, all of Ill.

[73] Assignee: Chemplex Company, Rolling Meadows, Ill.

[21] Appl. No.: 808,080

[22] Filed: Jun. 20, 1977

Related U.S. Application Data

[63] Continuation-in-part of Ser. No. 616,035, Sep. 22, 1975, abandoned.

[51] Int. Cl.² .............................................. C08L 51/00
[52] U.S. Cl. .............................. 428/500; 260/876 R; 428/521
[58] Field of Search ................... 260/876 R; 428/500, 428/521

[56] References Cited

U.S. PATENT DOCUMENTS

| 3,177,269 | 4/1965 | Nowak | 260/878 |
|---|---|---|---|
| 3,658,948 | 4/1972 | McConnell | 260/897 B |
| 3,856,889 | 12/1974 | McConnell | 260/897 B |
| 3,868,433 | 2/1975 | Bartz | 260/876 R |
| 3,873,643 | 3/1975 | Wu | 260/878 R |
| 3,882,194 | 5/1975 | Krebaum | 260/878 R |

*Primary Examiner*—Paul Lieberman
*Attorney, Agent, or Firm*—Wegner, Stellman, McCord, Wiles & Wood

[57] ABSTRACT

Compositions of matter having among other desirable characteristics strong adhesive properties to various substrates comprising blends of a graft copolymer of a high density polyethylene and at least one unsaturated, fused ring, carboxylic acid anhydride and this blended with one or more resin copolymers of ethylene and an ethylenically unsaturated ester.

53 Claims, No Drawings

4,087,588

ADHESIVE BLENDS

CROSS-REFERENCE TO RELATED APPLICATION

This application is a continuation-in-part of our application Ser. No. 616,035, filed Sept. 22, 1975 now abandoned.

BACKGROUND OF THE INVENTION

In our copending patent application Ser. No. 808,079, filed June 20, 1977 there is described a unique synergistic effect on adhesion by blending a fused ring carboxylic acid anhydride-grafted high density polyethylene or ethylene copolymer with a polyolefin resin. This present invention is concerned with a further improvement in that when ethylene-ester copolymers are used as blending resins, the resulting blends show even better adhesive strength. This improvement is obtained without losing the desirable properties of ethylene-ester copolymers, such as wide heat seal range, impact strength, etc. Furthermore, there is an optimum amount of the ethylenically unsaturated ester in the copolymer for this adhesion promotion. Thus, the object of this invention is to provide greatly enhanced adhesion to substrates such as polar polymers, metals, paper, glass, wood, etc. through the use of blends of copolymers of ethylene and ethylenically unsaturated esters with graft copolymers of high density polyethylene and its copolymers. These resins can be applied in any conventional manner and typical application processes are lamination, extrusion coating, coextrusion, powder coating, blow molding, etc.

It is well known that laminates of polyethylene with dissimilar substrates have many desirable characteristics. However, it is often difficult to bond polyethylenes to dissimilar substrates because of the differences in physical and chemical structures. To overcome the bonding difficulties, it has been proposed in the past to use either an adhesive layer between the polyolefin and the substrate or a more expensive, highly polar copolymer of ethylene such as an ionomer resin in place of the conventional polyethylene. This latter is not entirely successful because although the ionomer resin may show good adhesion the bond formed is easily weakened by exposure to moisture and solvents.

Another method for improving the adhesion of a polyolefin to a substrate is to graft polar functional groups onto the polyolefin backbone chain. The most common combination is maleic anhydride grafted to polypropylene. However, grafting of maleic anhydride on a polyethylene backbone when applied as in this invention does not give the adhesive power of the products of this invention.

SUMMARY OF THE INVENTION

The blends of graft copolymer and ethylene copolymers of this invention have improvements over previous systems of which applicants are aware and these improvements include: eliminating the need for additional adhesive layers when bonding unmodified polyethylenes to dissimilar substrates; economic advantages due to eliminating the need to use costly highly polar copolymers of ethylenes; excellent bond strength; and moisture and chemical insensitivity of the adhesive bond between the blends of this invention and various substrates.

By grafting suitable fused ring, unsaturated carboxylic acid anhydrides to high density polyethylene and ethylene copolymers and blending the resultant graft copolymers with an ethylene-ester copolymer, we have obtained composites with excellent adhesive strength to various substrates including polar polymers, metals, glass, paper, wood and the like. Furthermore, the adhesive bond formed is not easily affected by moisture or chemicals. Surprisingly, the adhesive strength of the blends is synergistically better than that of either component when tested alone. This occurs despite the fact that the concentration of fused ring carboxylic acid anhydride in the blends is reduced by dilution with the ungrafted resin component.

When ethylene-ester copolymers are used as the blending resin, they show dramatically increased adhesive strength compared to other resins. Ethylene-vinyl acetate copolymers are very effective as blending resins. Also, there is a preferred range of ester group content of the blending resin for maximum adhesion.

According to this invention, there are provided blends of copolymers of ethylene and ethylenically unsaturated esters with copolymers comprising high density polyethylene which are modified by grafting suitable unsaturated fused ring carboxylic acid anhydride monomers to exhibit improved adhesion to various substrates.

If the ethylene-ester copolymer is applied to a substrate such as aluminum or nylon, the adhesion is much poorer than if the ethylene-ester copolymer is blended with the graft copolymer described herein. Similarly, if the graft copolymer is used alone and applied to a substrate, the adhesion is poorer than that of the blend of the ethylene-ester copolymer and the graft copolymer. In other words, an unexpected synergistic effect is obtained.

In addition to this synergistic effect, enhanced adhesion is observed when ethylene-ester copolymers are used as the blending resins in comparison e.g., to polyethylene homopolymer resins. This effect is illustrated by the following: If the weight percent of the graft copolymer is kept constant, its blend with an ethylene-ester copolymer gives dramatically better adhesion than when the blending resin is a polyethylene homopolymer.

By ethylene-ester copolymers, it is meant copolymers of ethylene with ethylenically unsaturated monomers which contain an ester grouping. The major classes of these monomers are the vinyl esters, acrylate esters and methacrylate esters. Such esters have the general formulae:

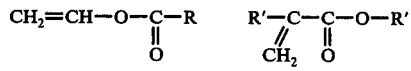

wherein R, R' and R" are organic radicals or hydrogen.

The term "high density polyethylene" used herein for the grafting backbone includes polymers of ethylene and copolymers with butene and other unsaturated aliphatic hydrocarbons. These high density polyethylenes and copolymers are usually prepared using transitional metal catalysts and also often are referred to as low or medium pressure polyethylenes as opposed to low density polyethylenes which often involve high pressure and free radical initiators. Preferably such high density polyethylenes have a density of about 0.930–0.970. Also, it is preferable sometimes to graft to blends of two or more of the above homopolymers and copolymers.

DESCRIPTION OF THE PREFERRED EMBODIMENTS

The preferred esters are vinyl esters in which R is a hydrocarbon radical containing 1–30 carbon atoms. Representatives of this class are vinyl acetate, vinyl propionate, vinyl butyrate, vinyl-2-ethylhexanoate, vinyl laurate and vinyl stearate. Also preferred are acrylate esters in which R' is hydrogen and R'' is a hydrocarbon radical containing 1–30 carbon atoms. Representatives of this class are methyl acrylate, ethyl acrylate, propyl acrylate, butyl acrylate, 2-ethylhexyl acrylate, lauryl acrylate and stearyl acrylate. Further examples of preferred esters are methacrylate esters in which R' is methyl and R'' is a hydrocarbon radical containing 1–30 carbon atoms such as methyl methacrylate, ethyl methacrylate, propyl methacrylate, butyl methacrylate, 2-ethylhexyl methacrylate, lauryl methacrylate and stearyl methacrylate. Other preferred esters are alkyl itaconates where R' is

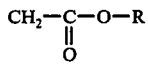

(where R is hydrocarbon radical containing 1–30 carbon atoms) and R'' is a hydrocarbon radical containing 1–30 carbon atoms such as dimethyl itaconate, diethyl itaconate and dibutyl itaconate.

Preferred ethylene-ester copolymers are ethylene-vinyl acetate copolymers.

It has been found surprisingly that when ethylene-vinyl acetate copolymers, for example, are used as the blending resin and the graft copolymer resin concentration of the blend is kept constant the adhesive strength of the blends first increases, then passes through a maximum, and then decreases with increasing vinyl acetate content of the blending resin.

Some of the graft copolymers are described and claimed in U.S. Pat. Nos. 3,873,643 and 3,882,194, both assigned to the assignee hereof.

The terms polyethylene and ethylene copolymers used herein for the backbone polymer for grafting includes polymers of ethylene and copolymers with propylene, butene and other unsaturated aliphatic hydrocarbons. Also, it is preferable sometimes to graft to blends of two or more of the above homopolymers and copolymers.

The unsaturated, fused ring carboxylic acid anhydrides and mixtures of these as graft monomers include compounds which contain one or more acyclic, polycyclic, carbocyclic and/or heterocyclic moieties not including the anhydride ring.

Fused ring is defined in the "International Encyclopedia of Chemical Science", D. Van Nostrand Co., Inc., Princeton, New Jersey, 1964, as "a structural element in the formula of a chemical compound consisting of two rings that are joined by having two atoms in common."

The rings may be simple, bridged, carbocyclic, heterocyclic, polycyclic or complex. These classes are represented respectively by the following structures which are meant to be illustrative rather than limiting:

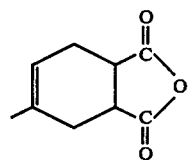

simple (acyclic moiety)
4-methylcyclohex-4-ene-1,2-dicarboxylic acid anhydride
(4-MTHPA)

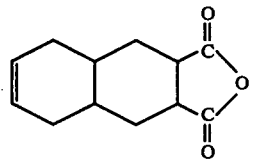

simple, carbocyclic
1,2,3,4,5,8,9,10-octahydro-naphthalene-2,3-dicarboxylic acid anhydride

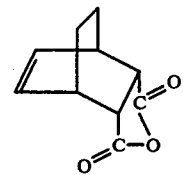

bridged, carbocyclic
bicyclo(2.2.2)oct-5-ene-2,3-dicarboxylic acid anhydride
(BODA)

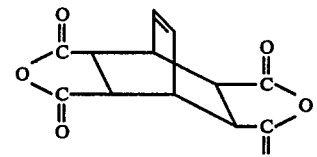

bridged, carbocyclic & complex
bicyclo(2.2.2)oct-7-ene-2,3,5,6-tetracarboxylic-2,3,5,6-dianhydride

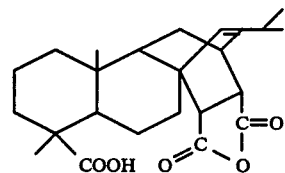

bridged, carbocyclic, polycyclic
& complex
maleo-pimaric acid
(M-PA)

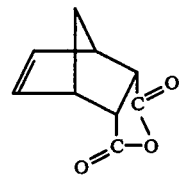

bridged, carbocyclic
bicyclo(2.2.1)hept-5-ene-2,3-dicarboxylic acid anhydride
(NBDA)

-continued

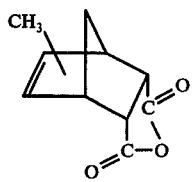

bridged, carbocyclic, mixture
of isomers
x-methylbicyclo(2.2.1)hept-
5-ene-2,3-
dicarboxylic acid anhydride
(XMNA)

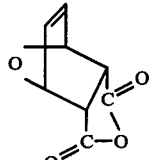

heterocyclic and bridged
7-oxabicyclo(2.2.1)hept-5-ene-
2,3-dicarboxylic acid anhydride It is often desirable in making the graft copolymers to use more than one monomers in order to control the physical properties of the final graft copolymer.

The method of making the graft copolymer of the blend of this invention in general consists of heating a mixture of the polymer or polymers and the monomer to be grafted in a solvent or above the melting point of the polyethylene with or without an initiator. Thus, the grafting occurs in the presence of air, hydroperoxides, other free radical catalysts or in the essential absence of these materials where the mixture is maintained at elevated temperatures and preferably under high shear.

The resulting graft copolymers used in the blends of this invention are found to consist of about 70–99.999 weight percent of polyethylene and about 30–0.001 weight percent of the unsaturated fused ring carboxylic acid anhydride or mixtures and these graft copolymers are capable of blending with a wide variety of ethylene-ester resins to produce the adhesive compositions of this invention. The preferred range for the anhydride in the graft copolymer is about 0.001–5 wt.%.

Excellent monomers in the graft copolymers of this invention include 4-methylcyclohex-4-ene-1,2-dicarboxylic acid anhydride, tetrahydrophthalic acid anhydride, x-methylnorborn-5-ene-2,3-dicarboxylic acid anhydride, norborn-5-ene-2,3-dicarboxylic acid anhydride, maleo-pimaric acid and bicyclo(2.2.2)oct-5-ene-2,3-dicarboxylic acid anhydride.

In preparing the blends of this invention from the above graft copolymers and the copolymers of ethylene and ethylenically unsaturated esters, any blending equipment or technique may be used. As an example only, all the blends were prepared in an electrically heated Brabender Plasticorder mixing head using a scroll type mixer under the following conditions: temperature = 350° F., rotor speed = 120 rpm, and mixing time = 5 minutes after flux.

The resultant blends were then compression molded into films approximately 0.006 inch thick at 350° F. The films were then pressed to the substrate under evaluation in a Pasadena Hydraulic compression molding press having plates 8 × 8 inches. The samples to be tested were held at 400° F. for 3 minutes at 1000 psig followed by quenching in a cold Pasadena Hydraulic Press held at 4000 psig. Slip sheets were used between the blend and the substrate in order to provide a tab for subsequent testing of the composite.

The resultant composites were tested by cutting into strips of varying widths from 1/16 inch to ¼ inch. The tab of the test substrate is attached to a fixed support and weights were hung in increments of 50 grams to the tab of the test film forming a 180° peel angle. Attempts were made to maintain an angle of 90° between the peel angle and the composite under test. The width of the test strip and the number of weights required to completely separate the composite were recorded.

The T-peel test described above is similar to the test described by Dickert et al. in Tappi, Vol. 51, No. 6, June, 1968, on page 66A except that the Tappi test used 30 gram weights and a one minute interval was used before the next weight is added. The point of failure in our test is the actual number of weights put on the sample rather than subtracting one-half of the last weight as described by Dickert et al.

The produce herein described is also related to ASTM D 1876-72 T-peel strength of adhesives with the following differences:

1. A motor driven instrument is used in ASTM D 1876-72 and the test panel is 12 inches long by 6 inches wide. The first 3 inches of length are bent back to form a 90° bend.
2. The separation rate of the bond is 5 inches per minute.
3. The strip width is 1 inch.
4. The peel strength is determined from the autographic curve for the first 5 inches of peeling after the initial peak.
5. The average peeling load in pounds per inch of the specimen width required to separate the adherents is reported.

EXAMPLE 1

XMNA is reacted with high density polyethylene homopolymer resin in a twin-screw extruder to give a graft copolymer resin with 1.0 weight percent XMNA incorporation and a melt index of 0.8 gm/10 min. The graft copolymer is blended in varying amounts with an ethylene-vinyl acetate copolymer resin of a melt index of 1.0 gm/10 min., a density of 0.929 gm/cc and vinyl acetate content of 4.7 weight percent. The blends as well as the graft copolymer resin itself and the ethylene-vinyl acetate copolymer resin itself are tested for adhesion to nylon 6 film. The results obtained are summarized below:

| Graft Copolymer in Blend (wt.%) | Adhesion to Nylon 6 No. of Weights (1/16" strip) |
| --- | --- |
| 0 | <1 |
| 1 | 8 |
| 5 | >11 |
| 40 | >11 |
| 50 | 8 |
| 75 | 3 |
| 90 | 2 |
| 100 | <1 |

As shown by the table, the adhesion of the blends of graft copolymer with ethylene-ester copolymer is better than that of either component when tested alone.

EXAMPLE 2

The graft copolymer resin described in Example 1 is blended at the 3 weight percent level with a polyethylene homopolymer resin of a melt index of 6.6 gm/10 min. and a density 0.917 gm/cc. The same graft copolymer resin is also blended at the 3 weight percent level with an ethylene-vinyl acetate copolymer resin of a melt index of 1.0 gm/10 min., a density of 0.929 gm/cc and vinyl acetate content of 4.7 weight percent. The results obtained are summarized below:

| Blending Resin Type | Adhesion to Nylon 6 No. of Weights (1/16" strip) |
|---|---|
| Polyethylene homopolymer | 2 |
| Ethylene-vinyl acetate copolymer | >11 |

As shown by the above data, when an ethylene-ester copolymer is used as the blending resin, better adhesive strength is obtained as compared to a similar blend made with a polyethylene homopolymer as the blending resin.

EXAMPLE 3

The graft copolymer described in Example 1 is blended at the 3 weight percent level with an ethylene-methyl acrylate copolymer resin of a melt index of approximately 2 gm/10 min., a density of approximately 0.94 gm/cc and methyl acrylate content of approximately 15 weight percent. The adhesion to nylon 6 film of this blend is compared to that of the polyethylene homopolymer blend, described in Example 2, in the table below.

| Blending Resin Type | Adhesion to Nylon 6 No. of Weights (1/16" strip) |
|---|---|
| Polyethylene homopolymer | 2 |
| Ethylene-methyl acrylate copolymer | 7 |

As shown above, ethylene-methyl acrylate copolymers may be used as the blending resin with improved results over a polyethylene homopolymer.

EXAMPLE 4

The graft copolymer described in Example 1 is blended at the 3 weight percent level with an ethylene-ethyl acrylate copolymer resin of a melt index of approximately 6 gm/10 min., a density of approximately 0.931 gm/cc and ethyl acrylate content of approximately 20 weight percent. The adhesion to nylon 6 film of this blend is compared to that of the polyethylene homopolymer blend described in Example 2 in the table below.

| Blending Resin Type | Adhesion to Nylon 6 No. of Weights (1/16" strip) |
|---|---|
| Polyethylene homopolymer | 2 |
| Ethylene-ethyl acrylate copolymer | 5 |

As shown above, ethylene-ethyl acrylate copolymers may be used as the blending resin with improved results over polyethylene homopolymer.

EXAMPLE 5

XMNA is reacted with a high density polyethylene homopolymer in a twin-screw extruder to give a graft copolymer resin with 1.0 wt.% XMNA incorporation. The above graft copolymer is blended at the 5 wt.% level with several resins containing different levels of vinyl acetate content. The blends are tested for adhesion to nylon 6 film. The results obtained are summarized below.

| Blending Resin Vinyl Acetate Content (wt. %) | Adhesion to Nylon 6 No. of Weights (1/16" strip) |
|---|---|
| 0 | 2 |
| 2.2 | >11 |
| 4.7 | >11 |
| 9 | >11 |
| 18 | 4 |
| 27.6 | 2 |

The data shows that surprisingly the adhesion of the blends containing the fused ring anhydride XMNA graft copolymer is markedly affected by the vinyl acetate content of the blending resin. It is seen that a resin with a vinyl acetate content below about 18 wt.% is remarkably and unexpectedly better in adhesion than a resin with a vinyl acetate content of 18 wt.% or above. The preferred range of vinyl acetate content is about 0.1–18 wt.%.

EXAMPLE 6

XMNA together with dibutyl maleate (DBM) are reacted with an ethylene-butene-1 copolymer resin in a twin-screw extruder to give a cografted copolymer resin with 1.4 wt.% XMNA and 1.1 wt.% DBM incorporation and a melt index of 0.64 gm/10 min. The above graft copolymer is blended at the 3 weight percent level with a polyethylene homopolymer resin as described in Example 2. The same graft copolymer resin is also blended at the 3 weight percent level with an ethylene-vinyl acetate copolymer resin of a melt index of 1.0 gm/10 min., a density of 0.929 gm/cc and vinyl acetate content of 4.7 weight percent. The blends are tested for adhesion to nylon 6 film. The results obtained are summarized below.

| Blending Resin Type | Adhesion to Nylon 6 No. of Weights (1/16" strip) |
|---|---|
| Polyethylene homopolymer | 2 |
| Ethylene-vinyl acetate copolymer | 9 |

As shown above, ethylene-ester copolymers show an advantage over polyethylene homopolymers as blending resins when the graft copolymer is an alpha-olefin copolymer of ethylene cografted with an unsaturated carboxylic acid anhydride plus an ester monomer.

EXAMPLE 7

XMNA is reacted with a high density polyethylene homopolymer resin in a twin-screw extruder to give a graft copolymer resin with 1.0 wt% XMNA incorporation. The above graft copolymer resin is blended in varying amounts with an ethylene-vinyl acetate copolymer resin of a melt index of 1.0 gm/10 min., a density of 0.929 gm/cc and a vinyl acetate content of 4.7 wt.%.

For comparison purposes XMNA is reacted with a low density polyethylene homopolymer resin in a twin-screw extruder to give a graft copolymer resin with 1.0 wt.% XMNA incorporation. This graft copolymer is blended in varying amounts with the ethylene vinyl acetate copolymer described above.

The blends as well as the graft copolymers themselves and the ethylene-vinyl acetate copolymer resin itself were tested for adhesion to nylon 6 film. The results obtained are summarized as follows:

| XMNA Graft Copolymer Prepared from HDPE (wt.% in Blend) | Adhesion to Nylon 6 No. of Weights (1/16" strip) |
|---|---|
| 0 | <1 |
| 1 | 8 |
| 3 | >11 |
| 5 | >11 |
| 15 | >11 |
| 25 | >11 |
| 100 | <1 |

| XMNA Graft Copolymer Prepared from LDPE (wt.% in Blend) | Adhesion to Nylon 6 No. of Weights (1/16" strip) |
|---|---|
| 0 | <1 |
| 1 | <1 |
| 3 | <1 |
| 5 | <1 |
| 15 | 2 |
| 25 | <1 |
| 100 | <1 |

As shown by the table, surprisingly, the blends containing the high density polyethylene graft copolymer are adhesive to nylon, whereas the blends containing the low density polyethylene graft copolymer are ineffective even though the grafting monomer and resultant graft incorporation are equivalent. These examples clearly indicate that the nature of the graft copolymer has to be very specific to produce effective adhesive blends. Not only does the anhydride have to be of a very specific type, i.e., fused ring, but also the polyethylene backbone must be high density.

EXAMPLE 8

XMNA is reacted with a high density polyethylene homopolymer resin in a twin-screw extruder to give a graft copolymer resin with 1.0 wt.% XMNA incorporation. The above graft copolymer is blended in varying amounts with an ethylene-vinyl acetate copolymer of a melt index of 2.0 gm/10 min., a density of 0.926 gm/cc and a vinyl acetate content of 2.0 wt.%. The blends as well as the graft copolymer itself and the ethylene-vinyl acetate copolymer resin itself are tested for adhesion to nylon 6 film.

For comparison purposes maleic anhydride is reacted with a high density polyethylene homopolymer in a twin-screw extruder to give a graft copolymer with 2.2 wt.% maleic anhydride incorporation. The maleic anhydride graft copolymer is blended in varying amounts with the same ethylene-vinyl acetate copolymer described above. The blend as well as the graft copolymer itself and the ethylene vinyl acetate copolymer resin itself are tested for adhesion to nylon 6 film. The results obtained are summarized below.

| Maleic Anhydride Graft Copolymer in Blend (wt. %) | Adhesion to Nylon 6 No. of Weights (1/16" strip) |
|---|---|
| 0 | <1 |
| 1 | 2 |
| 3 | 3 |
| 5 | 3 |
| 10 | 5 |
| 25 | 3 |
| 50 | <1 |
| 100 | <1 |

| XMNA Graft Copolymer in Blend (wt.%) | Adhesion to Nylon 6 No. of Weights (1/16" strip) |
|---|---|
| 0 | <1 |
| 1 | 7 |
| 3 | >11 |
| 5 | >11 |
| 15 | >11 |
| 25 | >11 |
| 50 | 7 |
| 100 | <1 |

As shown by the tables, surprisingly, the adhesion of the blends containing the fused ring anhydride XMNA graft copolymer is remarkably and unexpectedly better than the blends containing maleic anhydride graft copolymer. Even though maleic anhydride graft copolymers are taught to be effective in the prior art, this example clearly demonstrates the superiority of the fused ring anhydride graft copolymers of this invention. Unexpectedly, maleic anhydride graft copolymers are not effective in this invention.

EXAMPLE 9

NBDA, a fused ring anhydride, is reacted with high density polyethylene homopolymer resin in a twin-screw extruder to give a graft copolymer resin with 3.3 wt.% NBDA incorporation and a melt index of 0.16 gm/10 min. The graft copolymer is blended in varying amounts with an ethylene-vinyl acetate copolymer resin of a melt index of 1.0 gm/10 min., a density of 0.929 gm/cc and vinyl acetate content of 4.7 weight percent. The blends as well as the graft copolymer resin itself and the ethylene-vinyl acetate copolymer resin itself are tested for adhesion to nylon 6 film. The results are summarized below.

| NBDA Graft Copolymer (wt. % in Blend) | Adhesion to Nylon 6 No. of wts. (1/16" strip) |
|---|---|
| 0 | <1 |
| 5 | >11 |
| 25 | >11 |
| 50 | 4 |
| 100 | <1 |

For comparison purposes maleic anhydride is reacted with a high density polyethylene homopolymer in a twin-screw extruder to give a graft copolymer with 2.2 wt.% maleic anhydride incorporation. The maleic anhydride graft copolymer is blended in varying amounts with the same ethylene-vinyl acetate copolymer described in Example 8. The blend as well as the graft copolymer itself and the ethylene-vinyl acetate copolymer resin itself are tested for adhesion to nylon 6 film. The results obtained in this comparison experiment are summarized below.

| Maleic Anhydride Graft Copolymer in Blend (Wt. %) | Adhesion to Nylon 6 No. of Weights (1/16" strip) |
|---|---|
| 0 | <1 |
| 1 | 2 |
| 3 | 3 |
| 5 | 3 |
| 10 | 5 |
| 25 | 3 |
| 50 | <1 |
| 100 | 1 |

As shown by the tables, the adhesion of the blends of the fused ring anhydride graft copolymer with an ethylene-ester copolymer is better than that of either component when tested alone. Furthermore, when compared with the adhesion obtained with a graft copolymer of maleic anhydride on a high density polyethylene backbone prepared in the same manner as above, it is seen that the fused ring anhydride graft copolymer of NBDA gives much better adhesion to nylon. Surprisingly, despite the fact that maleic anhydride graft copolymers are reported to be effective in the prior art, the fused ring anhydride graft copolymer is superior.

EXAMPLE 10

The graft copolymer resin described in Example 1 is blended at the 3 weight percent level with an ethylene-vinyl acetate copolymer resin of a melt index of 1.0 gm/10 min., a density of 0.929 gm/cc and vinyl acetate content of 4.7 weight percent. The blend as well as DuPont Surlyn 1652 ionomer resin are tested for adhesion to nylon 6 film. As prepared, it requires 5 weights to separate a 1/16 inch strip of the ionomer resin from the nylon film and 11 weights will not separate a 1/16 strip of the graft copolymer blend from the nylon film. If a drop of water is placed at the point of separation of the test film and the nylon film, one weight is sufficient to completely separate the ionomer resin film from the nylon film, whereas the graft copolymer blend film cannot be separated from the nylon film with or without the drop of water using 11 weights. This shows that the adhesive bond formed between the ionomer resin and nylon is readily affected by moisture, whereas the adhesive bond formed between the graft copolymer blend and the nylon film is not easily affected by moisture.

EXAMPLE 11

The graft copolymer described in Example 1 is blended at the 5 wt.% level with an ethylene-vinyl acetate copolymer resin of a melt index of 1.0 gm/10 min., a density of 0.929 gm/cc and a vinyl acetate content of 4.7 weight percent. The blend as well as DuPont Surlyn ionomer resin are tested for adhesion to a nylon 6 film. As prepared, it required 5 weights to separate a 1/16 inch strip of the ionomer resin from the nylon. Eleven weights cannot separate the graft copolymer blend film from the nylon 6. If the films are soaked in an isopropanol-water mixture for 24 hours, the ionomer resin separates when one weight is put on the film, but the graft copolymer blend in ethylene-vinyl acetate copolymer still cannot be separated from the nylon 6. This shows that the adhesive bond formed between the graft copolymer blend and nylon 6 is not readily affected by the isopropanol-water mixture, whereas the ionomer resin bond to nylon 6 is very easily affected by the isopropanol-water mixture.

EXAMPLE 12

The graft copolymer described in Example 1 is blended at the 5 weight percent level with an ethylene-vinyl acetate copolymer resin of a melt index of 1.0 gm/10 min., a density of 0.929 gm/cc and a vinyl acetate content of 4.7 weight percent. The blend as well as DuPont Surlyn ionomer resin are tested for adhesion to a nylon 6 film. As prepared, it required 5 weights to separate a 1/16 inch strip of the ionomer resin from the nylon 6 film. Eleven weights cannot separate the graft copolymer blend film from its nylon 6 film. If the test films are soaked for 24 hours in acetone, the ionomer resin separates when 3 weights are hung from the film, whereas the graft copolymer blend in ethylene-vinyl acetate copolymer still cannot be separated from the nylon 6 film. This shows that the bond formed between the graft copolymer blend and nylon 6 is not easily affected by the acetone but the ionomer resin bond to nylon is weakened by the acetone.

EXAMPLE 13

The graft copolymer described in Example 1 is blended at the 3 weight percent level into a mixture of 50 weight percent of a polyethylene homopolymer whose melt index is 6.6 gm/10 min., and a density of 0.917 gm/cc and 50 weight percent of an ethylene-vinyl acetate copolymer resin of a melt index of 2.8 gm/10 min., a density of 0.930 gm/cc and a vinyl acetate content of 8.0 weight percent. The above blend is compared with a polyethylene homopolymer blend described in Example 2 for its adhesion to nylon 6. The results obtained are shown in the table below.

| Blending Resin Type | Adhesion to Nylon 6 No. of Weights (1/16" strip) |
|---|---|
| Polyethylene homopolymer | 2 |
| 50:50 mixture of polyethylene homopolymer and ethylene vinyl acetate copolymer | 7 |

As shown by the table above, blending an ethylene-vinyl acetate copolymer into a low density homopolymer significantly improves the adhesion to nylon.

EXAMPLE 14

XMNA is reacted with high density polyethylene homopolymer resin in a twin-screw extruder to give a graft copolymer resin with 1.0 wt.% XMNA incorporation whose melt viscosity is $1.5 \times 10^5$ poise ($\eta A$). The above graft copolymer is blended at the 5 wt.% level with an ethylene-vinyl acetate copolymer resin with a melt viscosity of $7 \times 10^4$ poise ($\eta B$) and a vinyl acetate content of 9.0 wt.%, where $\eta A$ is the shear viscosity of the graft copolymer and $\eta B$ is the shear viscosity of the blending resin.

For comparison purposes the high density graft copolymer resin described above is blended at the 5 wt.% level with a low molecular weight ethylene-vinyl acetate copolymer with a vinyl acetate content of 10 wt.% and a melt viscosity of 5.5 poise ($\eta B$). The results obtained are shown below.

| | Adhesion to Nylon 6 No. of Weights (1/16" strip) | $\log \frac{\eta A}{\eta B}$ |
|---|---|---|
| XMNA Graft Copolymer Blended with High MW Ethylene-Vinyl Acetate Copolymer | >11 | <2 |
| XMNA Graft Copolymer Blended with Low MW Ethylene-Vinyl Acetate Copolymer | 0 | >2 |

This experiment shows that in order to obtain desired adhesion, it is preferred to have the ratio of melt viscosity of the graft resin meet the following criterion:

$$\log (\eta A/\eta B) < 2$$

The low molecular weight ethylene-vinyl acetate does not satisfy the specification, log (A/B) <2, and the resultant blend does not show any adhesion; however, higher molecular weight ethylene-vinyl acetate copolymer satisfying the specification does exhibit strong adhesion.

EXAMPLE 15

XMNA is reacted with a high density polyethylene homopolymer in a twin-screw extruder to give a graft copolymer resin with 1.0 wt.% XMNA incorporation. The above graft copolymer is blended at the 3 wt.% level with several resins containing different levels of vinyl acetate content. The blends are tested for adhesion to aluminum. The results obtained are summarized below.

| Blending Resin Vinyl Acetate Content (Wt. %) | Adhesion to Aluminum No. of Weights (1/16" strip) |
|---|---|
| 0 | 2 |
| 2.2 | >11 |
| 4.7 | >11 |
| 9 | >11 |
| 18 | 5 |
| 27.6 | 2 |

The data shows that, surprisingly, the adhesion of the blends containing the fused ring anhydride XMNA graft copolymer is markedly affected by the vinyl acetate content of the blending resin. It is seen that the resin with a vinyl acetate content below 18 wt.% is remarkably and unexpectedly better in adhesion than the resin with a vinyl acetate content above 18 wt.%.

All parts and percentages herein are by weight.

A summarizing list of the abbreviations used herein to identify chemical ingredients is as follows:

BODA-bicyclo(2.2.2)ct-5-ene-2,3-dicarboxylic acid anhydride
DBM-dibutyl maleate
4-MTHPA-4-methylcyclohex-4-ene-1,2-dicarboxylic acid anhydride
NBDA-bicyclo(2.2.1)hept-5-ene-2,3-dicarboxylic acid anhydride
XMNA-x-methylbicyclo(2.2.1)hept-5-ene-2,3-dicarboxylic acid anhydride Having described our invention as related to the embodiments set out herein, it is our intention that the invention be not limited by any of the details of description, unless otherwise specified, but rather be construed broadly within its spirit and scope as set out in the appended claims.

We claim:

1. A modified polyolefin blend having improved adhesion to various substrates and consisting essentially of:
    (A) about 0.1–95 parts by weight in said blend of a graft copolymer of about 70–99.999 wt.% of a high density polyethylene backbone grafted with about 30–0.001 wt.% of at least one compound containing at least one member of the group consisting of unsaturated acyclic, carbocyclic, heterocyclic, and polycyclic moieties which are fused to at least one carboxylic acid anhydride-containing ring and
    (B) about 99.9–5 parts by weight of a copolymer of ethylene and an ethylenically unsaturated ester or a mixture of these.

2. The blend of claim 1 wherein there is further included an olefin homopolymer or copolymer.

3. The blend of claim 1 wherein (B) comprises ethylene-vinyl ester copolymers.

4. The blend of claim 1 wherein (B) comprises ethylene-acrylate copolymers.

5. The blend of claim 1 wherein said (A) comprises high density polyethylene having a density of about 0.930–0.970.

6. The blend of claim 1 wherein said (A) comprises a high density copolymer of at least 60 wt.% ethylene and up to 40 wt.% of an alpha-olefin containing from 4 to 6 carbon atoms.

7. The blend of claim 1 wherein said (A) comprises a blend of high density ethylene polymers and ethylene-alpha-olefin copolymers.

8. The blend of claim 1 wherein said graft copolymer of (A) comprises a high density polyethylene and 4-methylcyclohex-4-ene-1,2-dicarboxylic acid anhydride.

9. The blend of claim 1 wherein said (A) comprises a high density polyethylene polymer and at least one monomer comprising tetrahydrophthalic anhydride.

10. The blend of claim 1 wherein said carboxylic acid anhydride of (A) consists essentially of x-methyl bicyclo (2.2.1) hept-5-ene-2,3-dicarboxylic acid anhydride.

11. The blend of claim 1 wherein (B) consists essentially of an ethylene-vinyl acetate copolymer.

12. The blend of claim 1 wherein (B) comprises ethylene-vinyl acetate copolymer with about 0.1–18 wt.% vinyl acetate.

13. The blend of claim 12 wherein said blend also contains a polyethylene polymer as an additional (B) ingredient.

14. The blend of claim 1 wherein (B) comprises an ethylene-methyl acrylate copolymer.

15. The blend of claim 1 wherein (B) comprises an ethylene-methyl methacrylate copolymer.

16. The blend of claim 1 wherein (B) comprises an ethylene-ethyl acrylate copolymer.

17. The blend of claim 1 wherein (B) comprises an ethylene-methacrylate copolymer.

18. The blend of claim 1 wherein said compound of (A) is present in an amount of about 0.001–5 wt.% and said high density polyethylene backbone of (A) is present in an amount of about 99.999–95 wt.%.

19. The blend of claim 1 wherein said moiety is carbocyclic.

20. The blend of claim 1 wherein said anhydride of (A) contains up to about 35 carbon atoms.

21. The blend of claim 1 wherein said graft copolymer contains one or more of said anhydrides.

22. The blend of claim 1 wherein said (B) is selected to satisfy the equation:

log ($\eta A/\eta B$) <2, where
$\eta A$ = the shear viscosity of graft copolymer
$\eta B$ = the shear viscosity of said (B).

23. The blend of claim 1 wherein said carboxylic acid anhydride of (A) consists essentially of 4-methylcyclohex-4-ene-1,2-dicarboxylic acid anhydride.

24. The blend of claim 1 wherein said carboxylic acid anhydride of (A) consists essentially of bicyclo(2.2.2-anhydride of (A) consists essentially of bicyclo(2.2.2-) oct-5-ene-2,3-dicarboxylic acid anhydride.
anhydride of (A) consists essentially of bicyclo(2.2.1-anhydride of (A) consists essentially of bicyclo(2.2.1-) hept-5-ene-2,3-dicarboxylic acid anhydride.
    (A) a solid substrate, and adhered thereto (B) a modified polyolefin blend according to claim 1.

27. The composite structure of claim 26 wherein said substrate comprises a member of the class consisting of polar polymers, solid metals, glass, paper, wood and cellophane.

28. The composite structure of claim 26 wherein said substrate comprises nylon.

29. The composite structure of claim 26 wherein said substrate comprises aluminum.

30. The composite structure of claim 26 wherein said blend is according to claim 2.

31. The composite structure of claim 26 wherein said blend is according to claim 3.

32. The composite structure of claim 26 wherein said blend is according to claim 4.

33. The composite structure of claim 26 wherein said blend is according to claim 5.

34. The composite structure of claim 26 wherein said blend is according to claim 6.

35. The composite structure of claim 26 wherein said blend is according to claim 7.

36. The composite structure of claim 26 wherein said blend is according to claim 8.

37. The composite structure of claim 26 wherein said blend is according to claim 9.

38. The composite structure of claim 26 wherein said blend is according to claim 10.

39. The composite structure of claim 26 wherein said blend is according to claim 11.

40. The composite structure of claim 26 wherein said blend is according to claim 12.

41. The composite structure of claim 26 wherein said blend is according to claim 13.

42. The composite structure of claim 26 wherein said blend is according to claim 14.

43. The composite structure of claim 26 wherein said blend is according to claim 15.

44. The composite structure of claim 26 wherein said blend is according to claim 16.

45. The composite structure of claim 26 wherein said blend is according to claim 17.

46. The composite structure of claim 26 wherein said blend is according to claim 18.

47. The composite structure of claim 26 wherein said blend is according to claim 19.

48. The composite structure of claim 26 wherein said blend is according to claim 20.

49. The composite structure of claim 26 wherein said blend is according to claim 21.

50. The composite structure of claim 26 wherein said blend is according to claim 22.

51. The composite structure of claim 26 wherein said blend is according to claim 23.

52. The composite structure of claim 26 wherein said blend is according to claim 24.

53. The composite structure of claim 26 wherein said blend is according to claim 25.

* * * * *

UNITED STATES PATENT AND TRADEMARK OFFICE
CERTIFICATE OF CORRECTION

PATENT NO. : 4,087,588
DATED : May 2, 1978
INVENTOR(S) : Mitsuzo Shida et al

It is certified that error appears in the above-identified patent and that said Letters Patent are hereby corrected as shown below:

Column 14, cancel line 62 cancel line 65 and substitute the following:
-- 25. The blend of claim 1 wherein
said carboxylic acid -- after line 67, insert the following:
-- 26. A composite structure comprising: --

Signed and Sealed this

Fifth Day of September 1978

[SEAL]

Attest:

RUTH C. MASON
Attesting Officer

DONALD W. BANNER
Commissioner of Patents and Trademarks